United States Patent [19]

Smith

[11] 3,792,453

[45] Feb. 12, 1974

[54] DATA STORAGE SYSTEMS

[75] Inventor: Christopher Paul Relf Smith, Bishampton, England

[73] Assignee: Sperry Rand Limited, London, England

[22] Filed: Nov. 3, 1971

[21] Appl. No.: 195,417

[30] Foreign Application Priority Data

Nov. 5, 1970 Great Britain .................... 52652/70

[52] U.S. Cl. .......................................... 340/174.1 A

[51] Int. Cl. .......................................... G11b 5/02

[58] Field of Search .............. 340/174.1 B, 174.1 H; 179/100.2 MC

[56] References Cited

UNITED STATES PATENTS

| | | | |
|---|---|---|---|
| 3,154,762 | 10/1964 | Morpher, Jr. | 340/174.1 B |
| 3,197,739 | 7/1965 | Newman | 340/174.1 B |
| 3,456,237 | 7/1969 | Collins | 340/174.1 B |
| 3,196,419 | 7/1965 | Gabor | 340/174.1 B |
| 3,286,243 | 11/1966 | Floros | 340/174.1 B |
| 3,287,714 | 11/1966 | Dustin | 340/174.1 B |

*Primary Examiner*—Vincent P. Canney
*Attorney, Agent, or Firm*—H. P. Terry

[57] ABSTRACT

Apparatus for use in a data storage system having a parallel read mode and which comprises, for each track of a recording medium from which data is to be read simultaneously, storage means for storing data to be read, and means for extracting data from the data storage means at a predetermined instant such that data from each track is available for reading simultaneously. Thus the reading of data is effected by first recovering data from each track concerned and then aligning the data timewise for onward transmission to readout.

4 Claims, 2 Drawing Figures

PATENTED FEB 12 1974 3,792,453

DATA STORAGE SYSTEMS

This invention relates to data storage systems and is more particularly concerned with the reading of stored data from a magnetic storage medium.

In many data storage systems it is necessary to read data from only one track at a time but in other systems it is necessary to read simultaneously data from a plurality of tracks, such systems being known as parallel read systems.

According to the present invention apparatus for use in a data storage system having a parallel read mode comprises, for each track of a recording medium from which data is to be read simultaneously, storage means for storing data to be read, and means for extracting data from the data storage means at a predetermined instant such that data from each track is available for reading simultaneously.

The data storage means may comprise a shift register and the means for extracting the data therefrom may be switch means, delay means being provided for each track which are operable to delay data being fed into the shift register should such data coincide with a shift signal for the shift register, and control means also being provided for each track to control said switch means such that the latter tracks the first significant bit which may be a data bit or a bit heralding data (hereinafter referred to as a data herald), through the shift register until said predetermined instant when the data to be read is extracted from the shift register via the switch means. The control means for the switch means may be a counter which is fed with a predetermined number of pulses through gate means which are opened only on receipt in the associated shift register of said first significant bit to be read, the counter then becoming operable to index the switch means synchronously with the shift register until the predetermined number of pulses have been applied to the counter whereupon the switch means cease to track said first significant bit and begin to extract from the shift register the data to be read.

Thus the reading of data from the parallel read data system is effected by first recovering data from each track concerned and then aligning the data timewise for onward transmission to read-out. The alignment of the data from the various tracks is not highly critical in systems employing a relatively low data packing density but in high packing density systems the alignment is more critical in that any delay between data read from one track and data read from another track may involve several data bits as opposed to a fraction of a bit in the case of a low data packing density.

Figure 1:
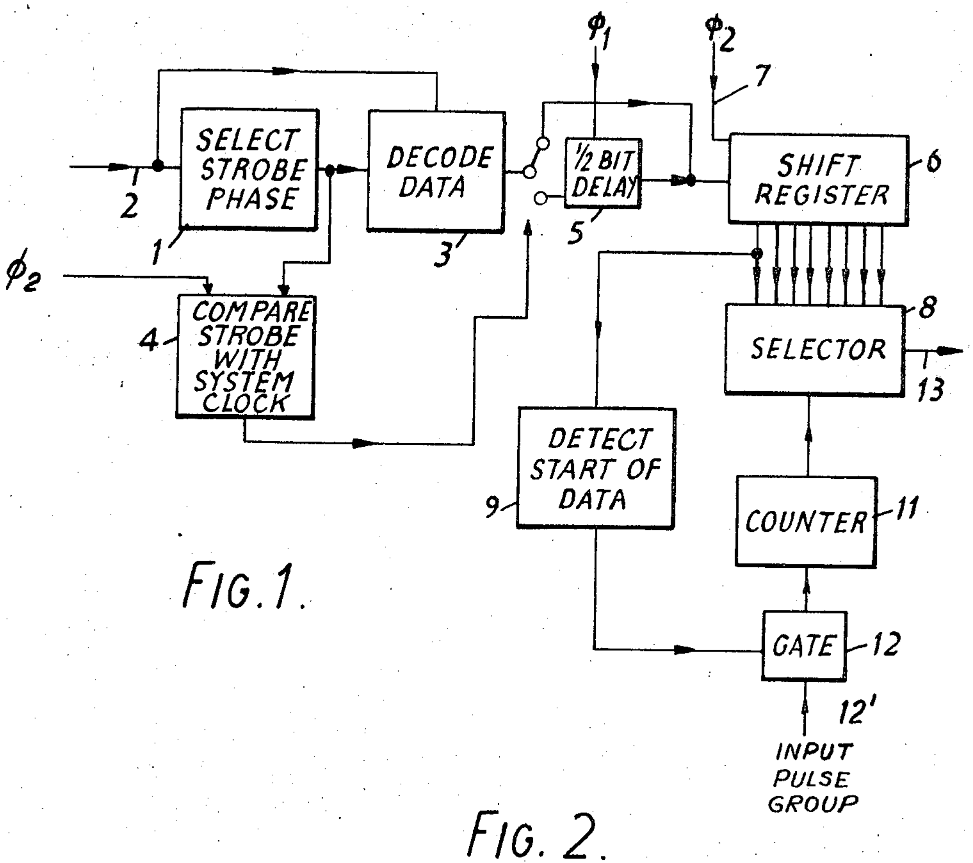
Figure 2:
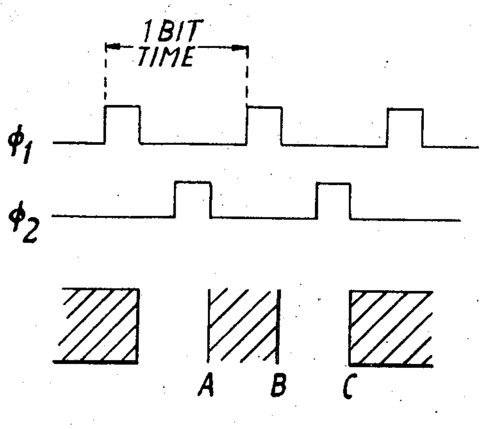

Apparatus for use in a parallel-read magnetic drum data storage system embodying the invention will be described below in greater detail, by way of example, with reference to the accompanying drawings, in which:

FIG. 1 is a block diagram of the read arrangement of the present invention associated with each track of the drum, and FIG. 2 is an illustrative timing diagram.

The apparatus of the present invention, as illustrated in FIG. 1 may, for example, be used in a conventional data storage system which provides the input signals to the input leads of FIG. 1 in a conventional manner and accepts the data on the output lead 13 thereof for utilization in a well-known manner. This data storage system in which the invention may be utilized comprises, for example, a timing section and a control section which enable data reading and writing to be effected. The general function of the timing section is to produce a clock signal used by the overall system for writing each data bit to be stored on the drum. It also decodes markers from a basic timing signal, the markers indicating the start of a drum revolution, the start of each sector on a data track and the end of each sector. A signal is also produced by the timing section which is used to ensure correct demodulation of a data signal. A phase-locked voltage-controlled oscillator is used to derive all the above signals, the oscillator operating at 24 M.Hz (nominal) which is sixteen times the frequency of the basic timing signal and constitutes the auxiliary timing signal.

The general function of the control section is to produce enabling signals, in the correct sequence and for the correct duration, required in order to store data at the desired location on the drum, or to read already stored data. This section also generates a preamble required at the start of each sector in the writing mode including a data herald which indicates the beginning of actual or useful data, and in the reading mode generates required timing signals correctly phased relative to the data to be read by utilising the preamble referred to. Furthermore, the control section produces transfer pulses required to shift data serially into and out of the system, and demodulates or decodes written data when reading.

In the read mode, data is strobed from a selected sector of a given track of the drum in such a manner that any discrepancy in phase between the basic timing signal used to clock the data from the track and the data to be read, due to relative movement between the data and timing heads, is reduced to within acceptable limits.

It will be appreciated that the above-described data storage system is an example of the environment in which the apparatus of the present invention may be utilized and from which the apparatus receives its input signals in a conventional manner and to which the apparatus provides its output signal.

In the apparatus of the present invention, as shown in FIG. 1, strobe selection means 1 are provided for each track for selecting the appropriate strobe phase to strobe data being fed in on a line 2. The output from the selector 1 is fed both to a data demodulator or decoder 3, which also receives the data on line 2, and a comparator 4 which compares the phase of the strobe signal with the basic timing or clock signal $\phi_2$ in order to determine whether the two coincide. If there is coincidence, delay means 5 are brought into operation whereby the decoded data is delayed by half a bit and is clocked out of the delay means by a clock signal $\phi_1$ which is 180° out of phase with respect to the signal $\phi_2$.

As is well known to those skilled in the data processing art, the strobe selection means 1 selectes the appropriate strobe phase to strobe data being fed in on the line 2 as discussed above. Numerous conventional self-strobing or self-clocking circuits are known in the art which may be utilized for such purposes to provide clock or strobe pulses that are synchronized with the incoming data on the line 2, these strobe or clock pulses being synchronized by the data itself.

As is conventional practice in the data processing art, the data on the line 2 is fed to the data decoder 3 from which decoded data is strobed by the self-strobing pulses from the selector 1. As is normally done in conventional systems, the data decoder 3 performs well known logical manipulations to convert the data from the form in which it is stored on the magnetic medium to a standard form. For example, when the data is conventionally stored in non-return-to-zero (NRZ)format, the data decoder 3 may be utilized to convert the data to the standard return-to-zero (RZ) format.

The decoded data is fed direct from the decoder 3 or via the delay means 5, as applicable, to an 8-bit shift register 6 through which it is progressed by $\phi_2$ fed in on line 7. The output of each stage of the shift register 6 is connected to one position of a multi-position selector switch 8, the output of the first stage also being connected to a detector 9 which in turn enables gate 12 the output of which is connected to a counter 11. The output of the counter 11 is fed to the selector 8, the counter only receiving input pulses fed in on a line 12' when the gate 12 is opened by the detector 9.

The detector 9 detects the occurence of the data herald of each sector and thereupon opens the gate 12 to allow the pulses applied to the gate 12 on line 12' to reach the counter 11. In this way, the counter 11 indexes the selector switch 8 so that the latter tracks the data herald as it progresses through the shift register, the output of the selector at this time thus being the data herald. When the counter ceases to operate on the cessation of the input pulses through the gate 12, the selector switch 8 remains in the position it is then at and from then on the data following the data herald is extracted from the shift register on the output line 13 of the selector. The method of data writing in the system is such that it is known that data read from any track will be at ±3 bit positions of the nominal position and, therefore, provision is made to delay the data to be read from each track by as much as six bits to ensure that the variation in data position between the tracks is taken up and the data thereby aligned timewise from track to track for onward transmission to readout. Thus the gate 12 of each track is supplied with the same six pulses on line 12' at the appropritate time, i.e. the first of the six pulses corresponding with, or being prior to, the earliest possible occurrence of the data herald, and it is only the balance of these six pulses which are fed to the counter 11 when the gate 12 is opened upon the detection of the data herald by the detector 9, whereby at the end of the six pulses data from each track is available for readout.

As is well known to those skilled in the data processing art, the data herald comprises a pulse that is distinct in character from the preceding data and may therefore be detected by any appropriate conventional circuit configuration in the block 9, numerous examples of which are known to those skilled in the art.

As already stated, the comparator 4 is operable to determine whether the one-half bit delay 5 is utizilied or bypassed when shifting data into the register 6. This is necessary because for any given sector the position of the data is not known in advance and the shift pulses cannot be arranged to occur at the correct time. The problem here is that if a shift pulse occurs immediately before, together with, or immediately after a change in data, the incorrect data can be shifted. Accordingly, the data is required to be steady before it is shifted and this condition is achieved by having two shift signals $\phi_1$ and $\phi_2$ 180° so that one of these signals must be suitable to shift a given sector of data.

FIG. 2 illustrates the various conditions that can arise in this respect. The leading edge of the data to be read can fall anywhere between A and C and if it falls between A and B, then $\phi_2$ can be used to shift the data into the register 6. This is because the data is steady by the time the next $\phi_2$ pulse occurs. If the data falls between B and C, ambiguity may arise because the data is changing close to the occurrence of $\phi_2$. Accordingly, the data is fed under this condition, to the delay means 5 and clocked out by $\phi_1$. Thus the data changes midway between consecutive $\phi_2$ pulses so that the latter can still be used to shift the data into the register 6. Clearly, if data falls at A or at B, the delay means 5 may or may not be employed, the decision being made by the comparator 4 at the beginning of a sector and adhered to for the remainder of the sector.

In the read mode then, the appropriate sector on each track to be read simultaneously is selected and six pulses applied to the gate 12 of each track. The most appropriate strobe is also selected for each track and the comparator 4 operates to decide whether or not the delay 5 has to be employed. As soon as the data herald of each track enters the first stage of the associated register 6, the gate 12 is opened and the balance of the six pulses are applied to the counter. After the sixth pulse has been applied, the switch 8 is no longer indexed to track the data herald through the registor 6 and therefore begins to extract the data on line 13 for onward transmission to readout. In this way, it is ensured that data from all the tracks concerned is available simultaneously.

It will be appreciated that the number of pulses applied to the gate 12 of each track depends on the design of the system as regards the maximum separation that can occur between data on two tracks. The size of the register 6 and switch 8 is chosen to suit the maximum number of pulses to be accommodated.

I claim:

1. Apparatus for each track of a recording medium of a data storage system from which data is to be simultaneously read in a parallel read mode, comprising
- shift register means coupled to receive data to be read,
- switch means coupled with said shift register means for extracting said data from said shift register means at a predetermined instant such that said data from each track is available for reading simultaneously, and
- control means for controlling said switch means to track a first significant bit through said shift register means until said predetermined instant when said data to be read is extracted from said shift register means via said switch means.

2. Apparatus according to claim 1 wherein said control means comprises
- counter means coupled with said switch means,
- gate means coupled with said counter means and coupled to receive a pulse group comprising a predetermined number of pulses, and
- means coupling said gate means with said shift register means for rendering said gate means conductive to pass said pulses to said counter means upon receipt in said shift register means of said first significant bit, said counter means being operable to index said switch means synchronously with said shift register means until said predetermined number of pulses have been applied to said gate means whereupon said switch means ceases to track said first significant bit and begins to extract said data to be read from said shift register means.

3. Apparatus according to claim 1 further including delay means coupled with said shift register means for delaying data applied to said shift register means when said data coincides with a shift signal for said shift register means.

4. Apparatus according to claim 3 further including selection means for selecting the appropriate strobe phase to strobe data to be read, and a comparator coupled to the output of said selection means for rendering said delay means operative when there is coincidence between the phase of the selected strobe and that of a basic timing signal for said system.

* * * * *